United States Patent [19]

Spykerman et al.

[11] Patent Number: 5,464,272
[45] Date of Patent: Nov. 7, 1995

[54] ARMREST

[75] Inventors: David J. Spykerman, Wyoming; Gerald M. DeShaw, Holland; Michael J. Gregg; Randy E. Eldred, Holland, all of Mich.

[73] Assignee: Prince Corporation, Holland, Mich.

[21] Appl. No.: 303,160

[22] Filed: Sep. 8, 1994

Related U.S. Application Data

[62] Division of Ser. No. 975,471, Nov. 12, 1992, Pat. No. 5,395,161.

[51] Int. Cl.$^6$ .................................................. A47C 31/00
[52] U.S. Cl. ............... 297/227; 297/411.32; 297/411.46; 297/DIG. 2
[58] Field of Search ........................... 297/411.2, 411.32, 297/411.46, 227, DIG. 2

[56] References Cited

U.S. PATENT DOCUMENTS

| | | | |
|---|---|---|---|
| 2,264,750 | 12/1941 | Gordon | 297/411.46 X |
| 2,703,602 | 3/1955 | Greenstadt | 297/227 |
| 2,914,119 | 11/1959 | Keefe, Jr. | 297/411.46 X |
| 3,027,196 | 3/1962 | Hamilton | 297/411.46 |
| 4,089,497 | 5/1978 | Miller et al. | 297/411.46 X |
| 4,285,544 | 8/1981 | Zapf | 297/227 |
| 4,597,606 | 7/1986 | Magee | 297/411.46 |
| 4,867,500 | 9/1989 | Oosterbaan et al. | 297/411.46 X |
| 5,133,097 | 7/1992 | Pyles | 297/227 X |
| 5,246,269 | 9/1993 | DeBoer et al. | 297/227 |
| 5,290,087 | 3/1994 | Spykerman | 297/411.32 X |

FOREIGN PATENT DOCUMENTS 2324436  12/1974  Germany ............................. 297/411.2

*Primary Examiner*—Peter M. Cuomo
*Assistant Examiner*—Suzanne L. Dino
*Attorney, Agent, or Firm*—Price, Heneveld, Cooper, DeWitt & Litton

[57] ABSTRACT

An armrest for a vehicle such as an automobile includes at least one concave core which is covered with an upholstery material. In one-embodiment, the peripheral edge of a core is covered with a panel which secures the edge of the upholstery material to the core. In another embodiment, the core defines recesses on opposite sides and is covered by a multi-sectioned upholstered panel with sides which extend into the recesses. In yet another embodiment, a plurality of concave core sections are covered by an upholstery material and hinged together to define an armrest.

8 Claims, 5 Drawing Sheets

ARMREST

This is a division of application Ser. No. 07/975,471, filed Nov. 12, 1992, now U.S. Pat. No. 5,395,161.

BACKGROUND OF THE INVENTION

The present invention pertains to an armrest and particularly armrests for use in vehicles such as automobiles.

Vehicle armrests have been made in a variety of structural forms. In the past, vehicle armrests have been made using a block of foam material which is upholstered in a conventional manner. Armrests have also included a structural skeleton over which foam material has been molded and subsequently upholstered to form the armrest. More recently, armrests have included polymeric cores which are generally hollow with padding applied only on the supporting surface and the entire armrest subsequently upholstered. U.S. Pat. No. 4,867,500 discloses such an armrest. With polymeric core-type armrests, it is necessary to provide a finished appearance to the upholstery which is consistent with the vehicle interior design. As a result, a variety of finishing techniques have been employed including trim rings, such as disclosed in U.S. Pat. Nos. 5,015,034 and 4,890,883. This construction provides a trim appearance to the armrest in relatively large openings such as provided by armrests with storage compartments or armrests which are relatively large and require mounting brackets for attachment to the vehicle.

In compact vehicles where space is more limited, the wide armrests of the type disclosed in the above-identified patents cannot be employed. Instead, relatively narrow individual armrests are employed for each of the vehicle seats. Such armrests can provide relatively large support surfaces by two axes of movement as disclosed in U.S. patent application Ser. No. 07/914,791, filed Jul. 16, 1992, and entitled ARTICULATED ARMREST. Also, split cores have been employed which include vehicle accessories such as cupholders as disclosed in U.S. Pat. No. 5,246,269, filed Feb. 8, 1991, and entitled ARMREST COVER. While these various armrest constructions provide desirable armrests for their intended purposes, the goal of a minimum size, inexpensive construction, and yet an attractive and durable armrest was not the primary design goal for these armrest designs.

SUMMARY OF THE PRESENT INVENTION

The armrest of the present invention provides an inexpensive, relatively compact armrest which employs a minimum amount of material and yet provides an attractive, sturdy armrest construction which is compatible with modern vehicle designs and high standards of quality. The armrest design of the present invention accomplishes these objectives by providing a core section in one embodiment which has an upholstered surface and a cover panel which encloses the core and holds the edges of the upholstery in place.

In another embodiment of the invention, a concave core has recessed sides and an upholstered folded panel is mounted to the core to complete the armrest structure.

In yet other embodiments of the invention, multiple concave core sections are hingedly joined together and upholstered with edges of the upholstery material tucked under adjacent free edges of the core sections to clamp the upholstery in place when the core sections are bonded together. These constructions provide armrests which are compact, relatively inexpensive and attractive in appearance and which are of a high quality and are durable for use in modern vehicles. The designs thus are particularly advantageous for use in relatively small spaces provided in compact vehicles which require individual seat armrests. These and other features, objects and advantages of the present invention will become apparent upon reading the following description thereof together with reference to the accompanying drawings in which:

DETAILED DESCRIPTION OF THE PREFERRED EMBODIMENT

Figure 1:
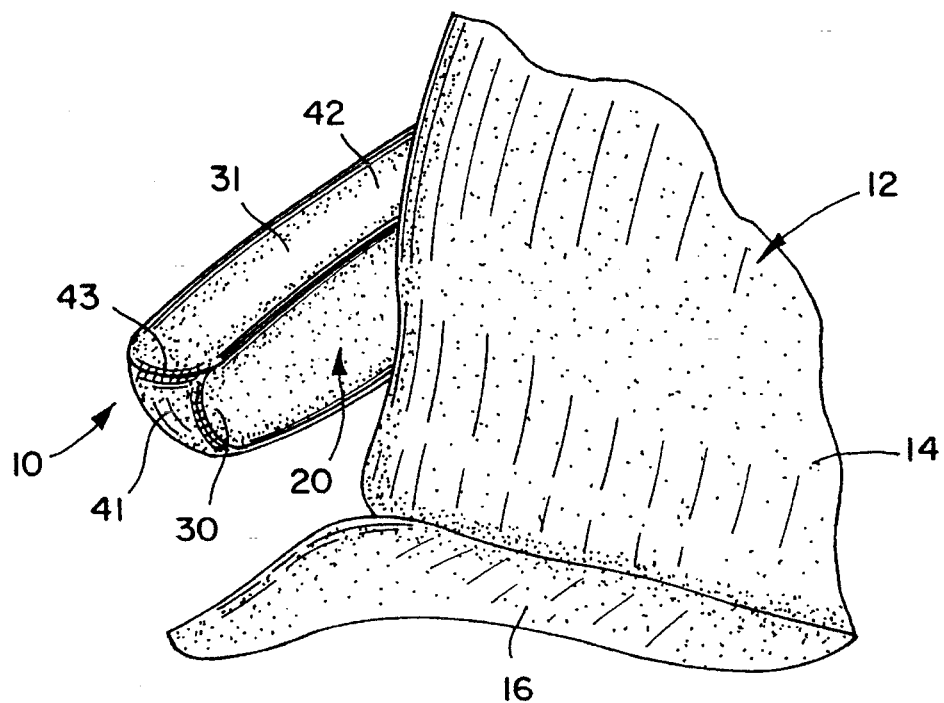
FIG. 1 is a fragmentary, perspective view of the interior of a vehicle including a seat and showing an armrest embodying the present invention.

Referring initially to FIG. 1, there is shown the interior of a vehicle 10 such as an automobile which includes a passenger seat 12 having a seat back 14 and support 16. Seat 12 can be of a conventional design including a framework included within seat back 14 for supporting an armrest assembly 20 of the present invention. The armrest assembly 20 can be pivotally coupled to the seat back framework in a conventional manner using a pivot axle extending laterally outwardly from the seat back 14 and to which the assembly 20 is coupled, as described below, to allow its movement between a lowered, use position as seen in FIG. 1 to a raised, stored position generally in the plane of seat back 14 (i.e., vertical). The construction of the armrest shown in FIG. 1 is shown in greater detail in FIGS. 2 and 3 which are now described.

The armrest assembly 20 includes a molded, polymeric, concave or boat-shaped shell 22 with an outer surface 24 defining the top, bottom and outer wall of the armrest when completed. The concave core or shell 22 extends longitudinally and includes longitudinally and transversely extending reinforcing ribs 21 and 23, respectively, as well as an axle receiving socket 26 for receiving a pivot axle mounted to the seat back 14 allowing pivotal movement of the armrest. Mounted to the longitudinally and transversely extending support ribs, also, are three mounting bosses 25 for receiving fastening screws 28 which assist in securing an outer, decorative cover or panel 30 for core 22 when the armrest is assembled as seen in FIG. 1.

Overlying the top surface 27 of core 22 is an upholstery pad 29 made of open-cell foam polymeric material to provide a padded armresting support surface 31 for the finished armrest as viewed in FIG. 1. Covering the core and pad 29 is an outer decorative upholstery cover 40 which can be made of pre-cut, crescent-shaped upholstery panels 41 and 42 joined along a common seam 43 by stitching or conventional bonding techniques. The upholstery shell 40 so formed extends over the core 22 and upholstery Pad 29 and the decorative panel 30 is attached utilizing fastening screws 28 and metal spring clips 32 which extend between longitudinal ribs 21 of core 22 and similarly aligned ribs 31 formed in the decorative panel 30 as seen in the broken-away view of FIG. 2.

Figure 3:
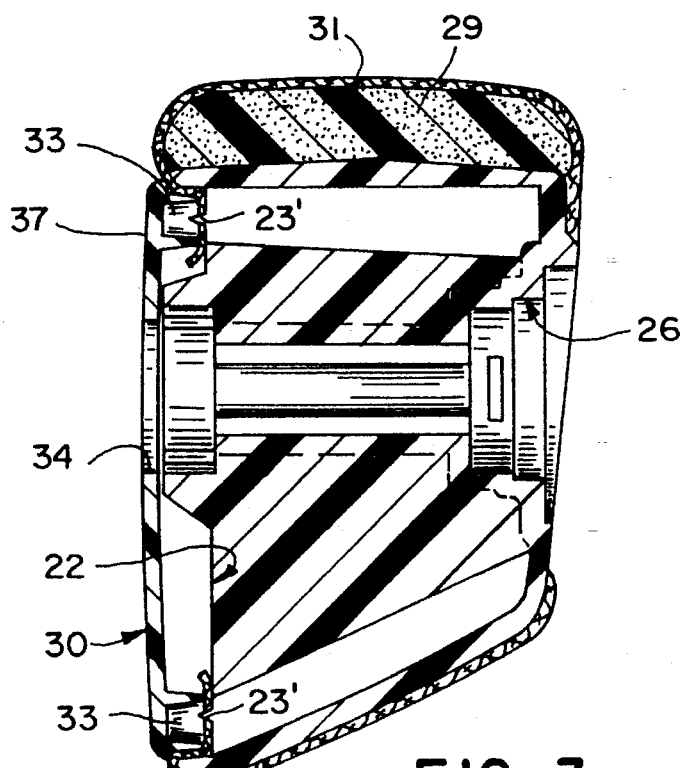
FIG. 3 is an enlarged, cross-sectional view of the armrest shown in FIG. 2, shown when assembled and taken along section line III—III of FIG. 2.

Clips 32 are generally S-shaped having a first opening 33 which attaches to and lockably fit over ribs 31 of cover 30 and a second opening 35 which attaches to ribs 21 of core 22. The edges 45 of the fabric panels 41 and 42 tuck over the peripheral edge 25' of core 22 and are clamped in position by the attachment of cover 30 which holds the edges 45 of the fabric shell 40 against edge 25' of core 22 to provide a neat trim appearance to the armrest as best seen in FIGS. 1 and 3. Teeth 23' (FIGS. 2 and 3) extend upwardly from ribs 23 and engage the fabric or vinyl upholstery which is pushed over them by sockets 33 (FIGS. 2 and 3) of panel 30.

Panel 30 includes a central aperture 34 which permits the pivot axle (not shown) to be extended within socket 26 of core 22 while the fasteners 28 are generally concealed in the area between the cover panel 30 and edge of seat back 14, as seen in FIG. 1, for all positions of use and storage of the armrest. The outer surface 37 of the decorative panel 30 may include a pebble-grained texture or the like to provide an attractive appearance which conforms to that of the vehicle. Panel 30 is molded of a polymeric material colored to match both the upholstered core 40 and the seat 12 to which the armrest is mounted. Thus, the armrest of the first embodiment of the present invention provides a relatively inexpensive, compact armrest with few parts and which provides ease of assembly to further reduce costs and improve the durability of the armrest. The upholstery material complements the decorative panel 30 which serves the dual function of resisting wear when moved against the fabric seat back 12 during use, as well as clamping the upholstery material to the armrest core to hold the upholstery material in position without the need for additional trimming steps or structures.

In an alternative embodiment of the invention shown in FIGS. 4 and 5, an armrest assembly 50 is provided and can be mounted to the vehicle in the same manner, using the same structure as described in connection with armrest assembly 20. Assembly 50 includes a polymeric core 52 having integral sidewalls 53 and 54 and a bottom or floor 55 defining a generally U-shaped cross section as seen in FIG. 5. The bottom wall 55 includes peripheral rims 57 and 58 extending laterally outwardly on opposite sides to define a recess 59 on either side of the armrest for receiving a panel 68 as best seen in FIG. 5.

The bottom wall 55 of the armrest is exposed in its assembled condition and preferably has a decorative, pebble-grained outer surface 55' to provide a trim appearance to the armrest. Wall 55 extends upwardly and forwardly terminating in a forward end wall section 60 and upwardly and rearwardly terminating in a rear wall section 62 as seen in FIG. 4. The top and sides of core 52 are covered by a decorative fabric 64 which overlies and is attached to a polypropylene backing multi-section hinged panel structure comprising a center panel 63 and first and second side panels 66 and 68 which can be formed from a single injection molded piece with integral hinges 65 of the panel sections. The panel is folded as seen in FIG. 5 to fit immediately adjacent walls 53 and 54 with the sides being aligned within recesses 59 on opposite sides of the core 52. A foam polymeric pad 69 is attached under the upholstery 64 and between the upholstery and center panel 63 as seen in FIG. 5 to provide a cushioned, armresting surface for the armrest. The ends of the fabric are tucked under and glued by a suitable bonding adhesive around the peripheral edges of the polypropylene panels 66 and 68 as shown by reference numeral 70 in FIG. 4. The resultant upholstered cover for core 52 is attached to the core 52 by a suitable bonding adhesive to complete the assembly of the armrest 50. Thus, as with armrest 20, the armrest 50 includes an exterior, exposed polymeric panel forming at least one surface of the armrest which, in the case of the embodiment of FIGS. 4 and 5, is integral with the armrest core and which is upholstered by a plurality of folded flaps of upholstered panels which can be made of fiberboard or other suitable material.

Figure 8:
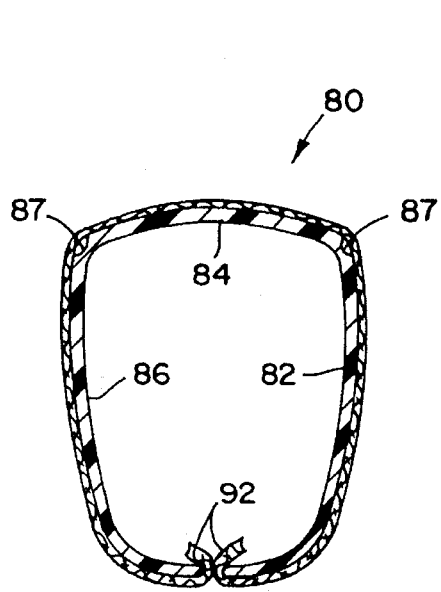
FIG. 8 is a cross-sectional view of the structure shown in FIG. 7, taken along section line VIII—VIII of FIG. 6.
Figure 6:
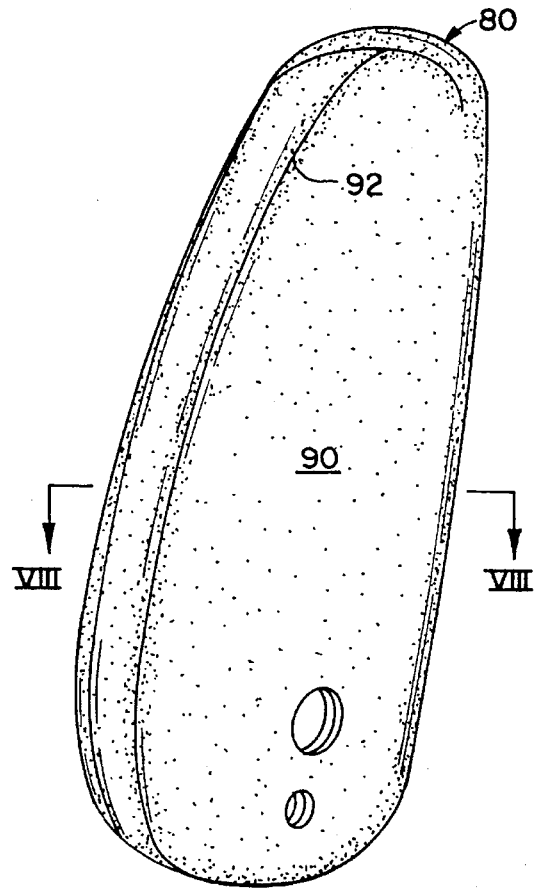
FIG. 6 is a fragmentary, perspective view of another embodiment of the present invention.
Figure 7:
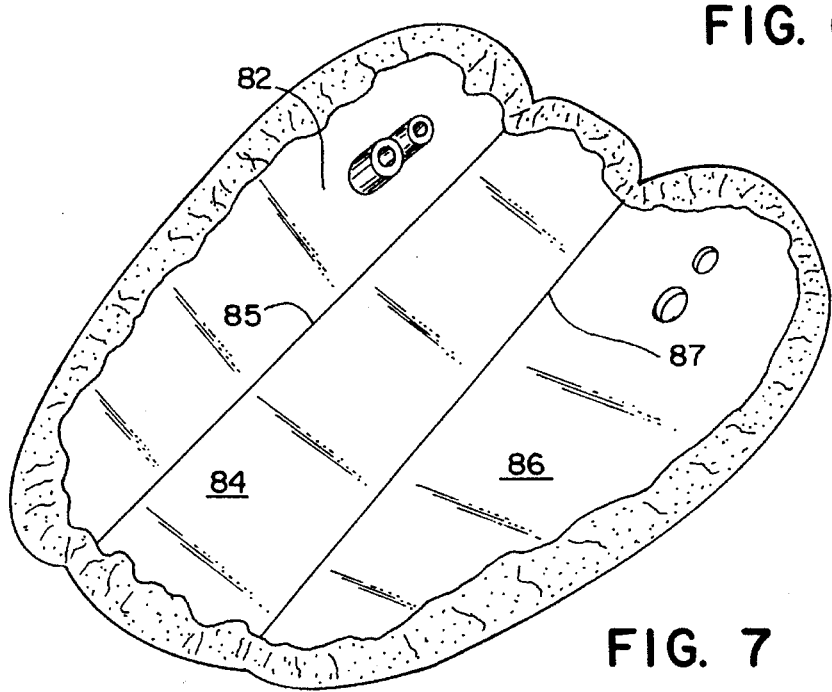
FIG. 7 is a fragmentary, perspective view of the armrest shown in FIG. 6, shown in a partially assembled position.

Another embodiment of the invention is shown in FIGS. 6–8, where in FIG. 6 a perspective view of an armrest 80 in a raised position is shown. Armrest 80 has an all-fabric exterior and includes three generally concave polymeric core sections 82, 84 and 86 as best seen in FIGS. 7 and 8. Each of the core sections are molded polymeric, relatively thin-walled shells which are collectively aligned as seen in FIG. 7 and covered with a suitable exterior upholstery fabric 90 which may include a pad between the upholstery fabric 90 and upper core member 84. The upholstery material 90 itself may be a cushioned upholstery material and includes ends 92 which tuck under and around the peripheral edges of the three core members as seen in FIG. 7. When this clamshell-type construction is completed, the sides 82 and 86 are folded together to form a T-shaped seam 92 at the front as best seen in FIG. 6 where the individual cores and fabric flaps are joined.

Figure 2:
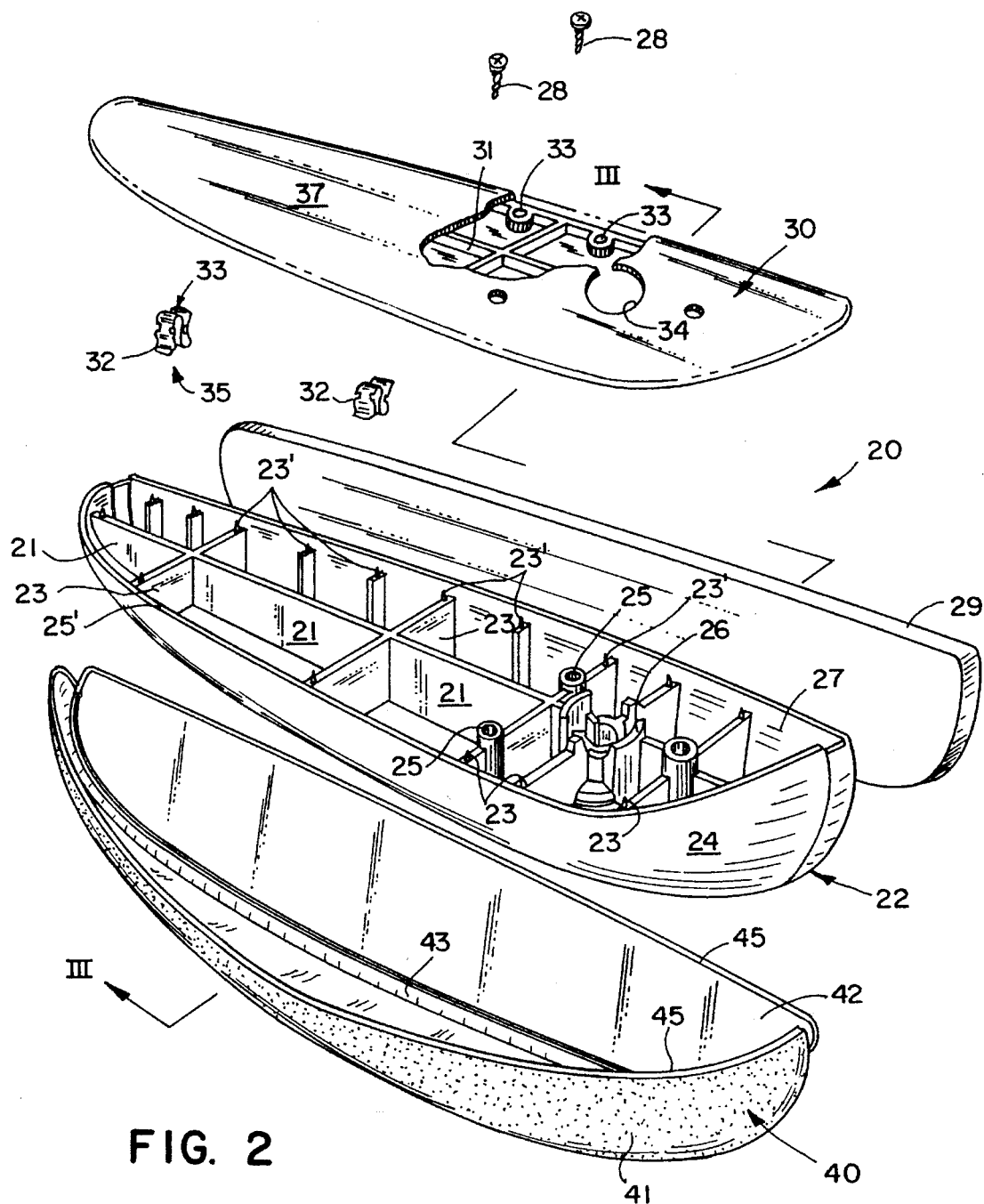
FIG. 2 is an exploded, perspective view of an armrest embodying the present invention.

Armrest 80, as in the previous embodiments, is mounted to the vehicle seat back 14 (FIG. 1) utilizing a conventional pivot mounting assembly of the type shown at 26 in FIGS. 2 and 3. The sidewalls 82 and 86 of the armrest 80 are secured in the assembled position shown in FIG. 8 using a suitable bonding adhesive, hydrosealing, or by ultrasonic welding, the later two methods fusing the edges of the sidewalls together. If the relatively thin-walled core sections 82 and 86 include reinforcing rib spring clips, such as clips 32 shown in FIG. 2, they could also be employed for snapping the sidewalls 82 and 86 in a closed position.

The core halves 82 and 86 are generally concave, and the junction between the edges of core halves 82 and 86 and the upper core section 84 may be integral with a polymeric hinge joining them along seams 85 and 87 (FIGS. 7 and 8) to facilitate molding and assembly, Alternatively, the upholstery fabric itself may form the hinges between the core sections. For such purpose the upholstery material 90 would be glued or otherwise adhered to the outer surfaces of the core sections.

Figure 4:
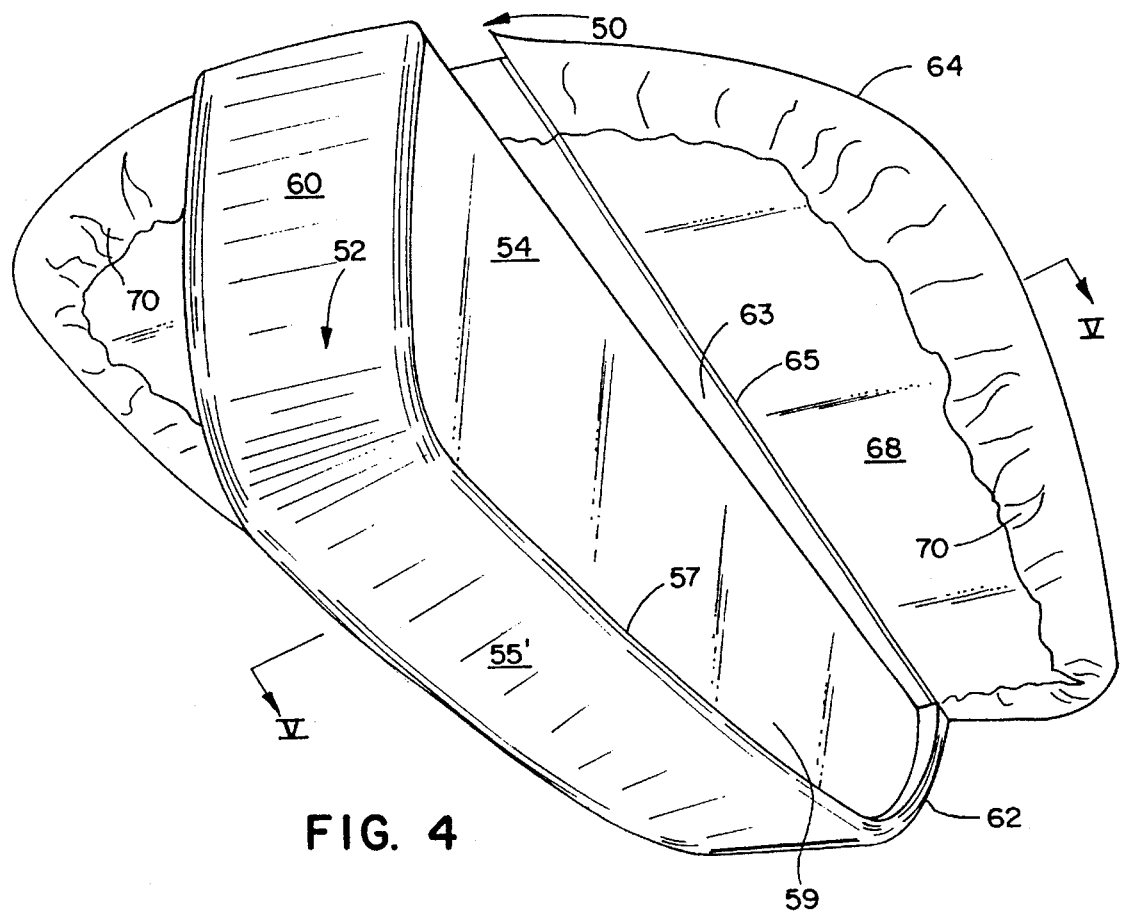
FIG. 4 is a perspective view of an alternative embodiment of the armrest of the present invention shown in a partially assembled position.
Figure 5:
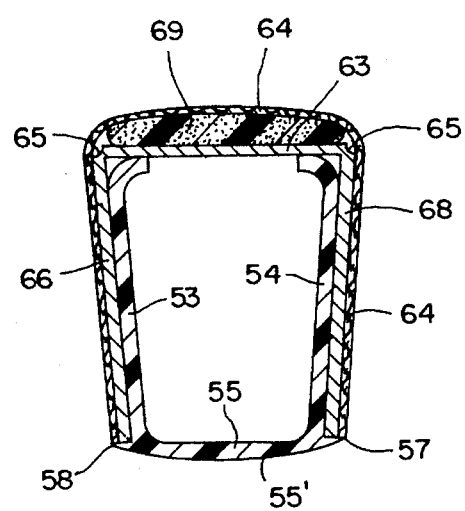
FIG. 5 is a cross-sectional view of the armrest shown in FIG. 4 once assembled and taken along section line V—V of FIG. 4.
Figure 9:
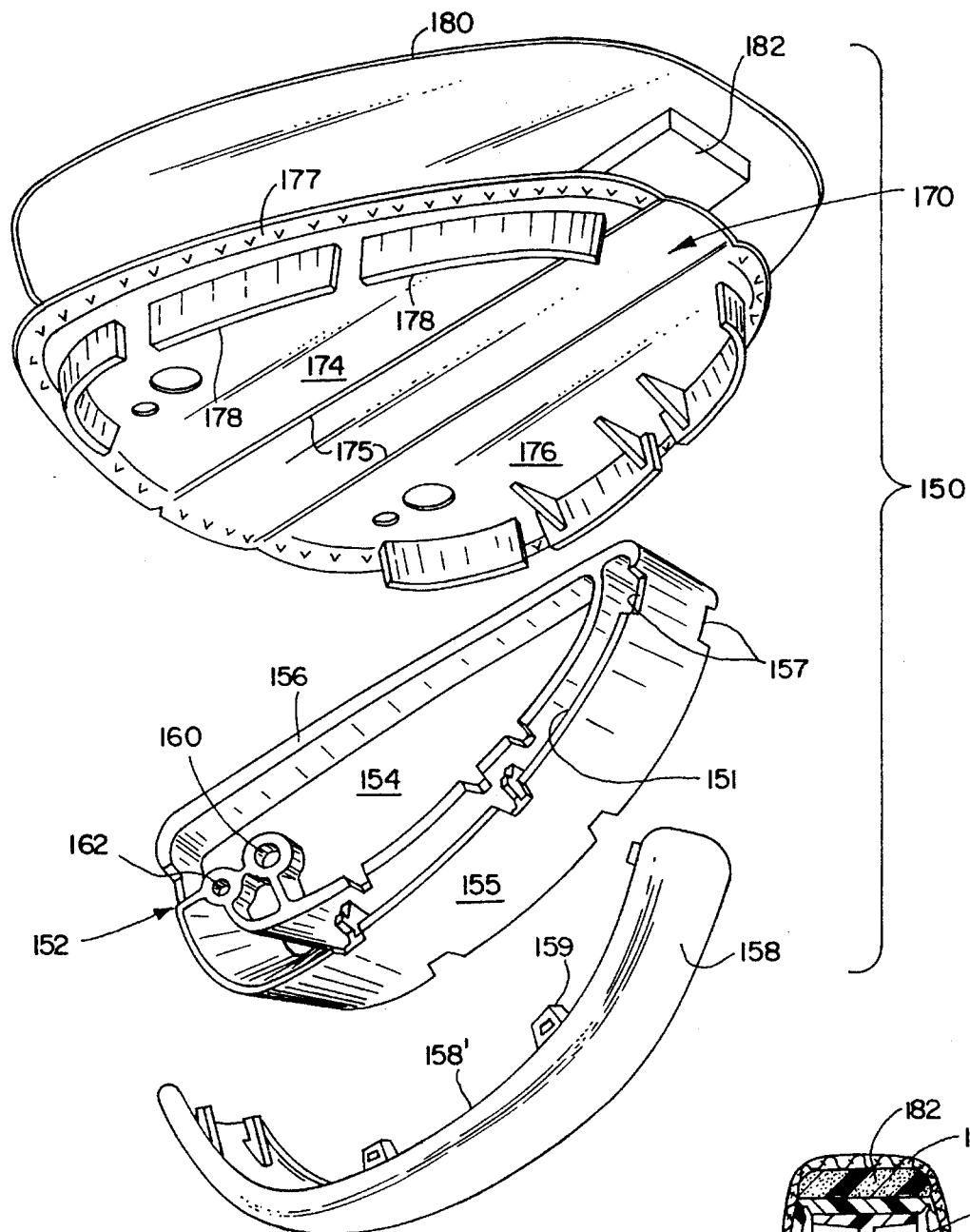
FIG. 9 is a perspective exploded view of an alternative embodiment of the invention.
Figure 10:
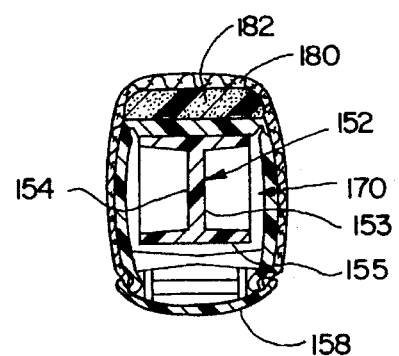
FIG. 10 is a cross-sectional view of the armrest of FIG. 9 once assembled and taken along section line X—X of FIG. 9.

Yet another embodiment of the invention is shown in FIGS. 9 and 10 which is somewhat similar to the structure shown of the embodiment of FIGS. 4 and 5. In this embodiment, an armrest assembly 150 is mounted to the vehicle in the same manner as that of the previous embodiments using the same general construction described in connection with the armrest assembly 20. Assembly 150 includes a polymeric core 152 which, as seen in FIG. 10, comprises a generally I-shaped structure with recessed sidewalls 153 and 154 a curvilinear bottom 155 and a top 156.

Bottom 155 includes a plurality o° f spaced slots 157 on opposite edges for receiving a curved trim plate 158 with locking tabs 159 extending therefrom for matably engaging slots 157 and locking the trim plate 158 in place as seen in FIG. 10. Core 152 includes an axle receiving boss 160 for mounting the armrest to the seat structure as well as a second boss 162 for receiving a stop pin limiting the motion of the armrest in a conventional manner.

Covering the armrest core 152 is a pre-section polypropylene panel 170 integrally including a center section 172, a first side section 174 and a second side section 176. The cover 170 is integrally molded with hinges 175 joining sections 174 and 176 to center 172. Flanges 178 are spaced inwardly from the edge of panel 170 and extend downwardly to fit within a groove 151 of core 152 with spaces being provided between the flanges 178 for receiving locking tabs 159 of trim cover 158.

Extending around the peripheral edge of panel 170 are a plurality of spaced, generally conical teeth 177 which assist in holding a fabric cover 180 in position when assembled as seen in FIG. 10. The fabric wraps around the top surface of core 152 and holds a section of padding 182 to the top surface of the armrest so formed with the fabric being held by the teeth 177 and the compression of the hinged flanges 158' of trim cover 158 as best seen in FIG. 10 for holding the armrest sections in an assembled position.

Thus, the armrest structure 150 provides a snap-together molded polymeric armrest with fabric upper and side surfaces and a decorative hard shell lower surface with an appearance substantially the same as that of the armrest shown in FIGS. 4 and 5, whereby the upholstered sides of of the armrest are flush with the bottom trim member. This is accomplished in the embodiment of FIGS. 4 and 5 by the recessed sides of core and by the similar recessed sides in the embodiment of FIGS. 9 and 10.

In each of the embodiments, the polymeric cores can be integrally molded of polycarbonate, polypropylene, polyvinylchloride or other suitable polymeric material used in the automotive environment. It will become apparent to those skilled in the art that various modifications to the preferred embodiments of the invention as described herein can be made without departing from the spirit or scope thereof as defined by the appended claims.

The embodiments of the invention in which an exclusive property or privilege is claimed are defined as follows.

1. An armrest for a vehicle such as an automobile comprising:

a first concave, molded core section defining a first sidewall of an armrest;

a second concave, molded core section defining a top of an armrest;

a third concave, molded core section defining a second sidewall of an armrest wherein said first, second and third core sections extend substantially the entire length of the armrest defined by said sections;

an upholstery covering for covering the outer surfaces of said first, second and third core sections and extending around at least a pair of abutting peripheral edges of said first, second and third core sections to be clamped in place when said first, second and third core sections are placed into abutting relationship; and means for holding said first, second and third core sections together.

2. The armrest as defined in claim 1 wherein said first, second and third concave core sections are integrally molded with hinge means extending between adjacent sections.

3. The armrest as defined in claim 1 wherein said upholstery material extends around at least a portion of mating peripheral edges of said first, second and third core sections to be clamped between said edges when said first, second and third core sections are held together.

4. The armrest as defined in claim 3 wherein said means for holding said first, second and third core sections together comprises a bonding adhesive.

5. An armrest for a vehicle such as an automobile comprising:

a plurality of integrally joined, molded, polymeric core sections individually defining at least a pair of sidewalls and a top for an armrest, wherein said core sections extend substantially the entire length of the armrest defined by said sections and wherein adjacent ones of said sections are joined by an integral hinge to allow the sections to fold together to form an armrest;

an upholstery covering for covering the outer surfaces of said core sections and extending around at least a pair of abutting peripheral edges of said core sections to be clamped in place when said core sections are placed into abutting relationship; and means for holding said core sections together.

6. The armrest as defined in claim 5 wherein said core sections are concave.

7. The armrest as defined in claim 6 wherein said armrest includes three concave core sections with a first one of said sections defining the top of said armrest and second and third of said sections forming sides of said armrest.

8. The armrest as defined in claim 7 wherein said means for holding said armrest sections together comprises a bonding adhesive.

* * * * *